(No Model.)

J. F. McCORMICK.
VEHICLE WHEEL.

No. 564,446.

Patented July 21, 1896.

Witnesses:
Charles Marien
M. McDonald.

Inventor:
James F. McCormick
by Thurman and Silvius
Attorneys.

UNITED STATES PATENT OFFICE.

JAMES F. McCORMICK, OF WEST INDIANAPOLIS, INDIANA.

VEHICLE-WHEEL.

SPECIFICATION forming part of Letters Patent No. 564,446, dated July 21, 1896.

Application filed January 25, 1896. Serial No. 576,819. (No model.)

*To all whom it may concern:*

Be it known that I, JAMES F. MCCORMICK, a citizen of the United States, residing at West Indianapolis, in the county of Marion and State of Indiana, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of vehicle-wheels in which the spokes are under a tension exerted between the hub or center and the rim or felly, whereby the rim is used as an arch supporting a load, as occurs in bicycle or other vehicle wheels, at the center; and it consists in novel arrangement of the spokes and peculiar construction of the hub, whereby the strain is more readily produced and maintained and the hub constantly maintained in an exactly central position with the rim, as will be more fully described hereinafter.

The object of my invention is to provide a vehicle-wheel in which the usual difficulties and evils of a wheel of this class are eliminated by providing a series or system of spokes which shall be of a uniform length, and means by which they may be conveniently applied and renewed when necessary for repairs.

A further object is to provide a means by which the tension on the spokes may be readily increased uniformly throughout the whole circle whenever desired; and with these objects in view my invention consists of few parts, of very simple construction, is easily manufactured, and is durable and economical in use.

Figure 1:
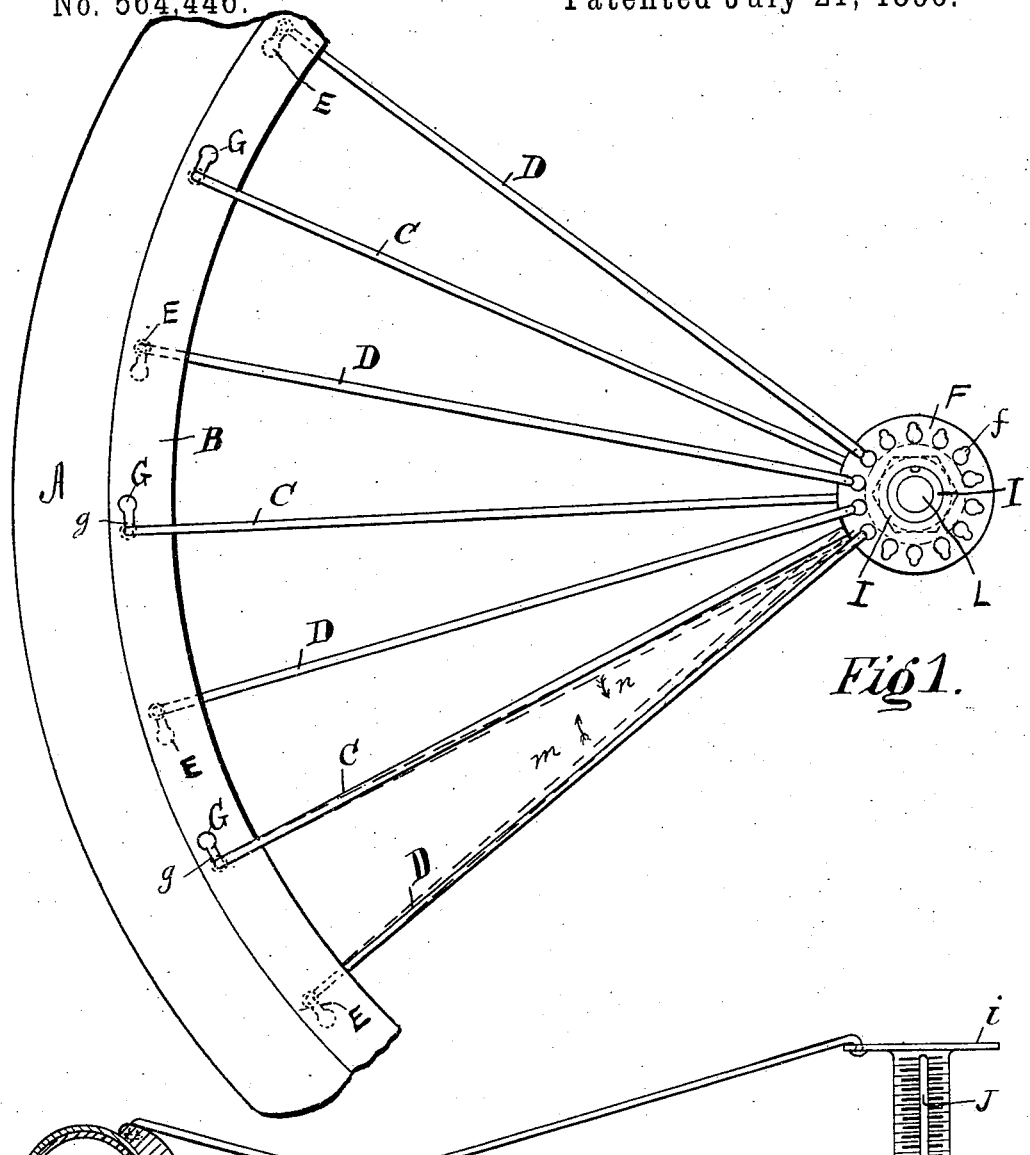
Figure 2:
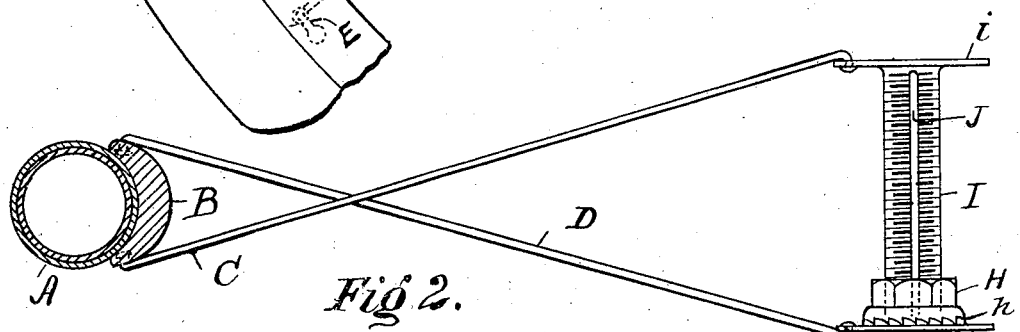

Referring to the drawings, Fig. 1 represents a side view of a portion of a wheel embodying my devices, and Fig. 2 is a transverse sectional view of rim and tire and plan of hub and spokes.

In the drawings, I represents a hollow hub, on one end of which is secured or made integral therewith a flange $i$, and on the opposite end is a flange F, fitting on the end of said hub sufficiently loose to be revoluble. The inner side of the flange F is provided with a circular series of ratchet-teeth. Adjoining this flange is a sleeve or collar $h$, having on its side next to the flange F a series of ratchet-teeth corresponding to those on the adjacent face of the flange F. The collar $h$ fits neatly over the hub I, so that it may slide longitudinally back and forth on the hub, but is prevented from rotating by means of a feather or dowel secured inside of the hole through its center, the dowel protruding and entering the longitudinal slot J on the outside of the hub. The whole length of the hub-barrel from the outside of the flange F to the opposite flange is provided with screw-threads on its outer diameter, and the threaded nut H is fitted to screw over the hub-barrel, one of its faces coming in contact with the collar $h$. The flanges F and $i$ have a series of pear-shaped perforations $f$ near the outer edge for receiving the heads of the spokes. The hole L, extending through the hub for receiving the axle, may be provided with any suitable ball-bearings. C D represent metallic spokes formed of a uniform length and all in the wheel being identical.

The rim B is covered by a tire A. At the sides of the rim, suitable distances apart and any number corresponding to the holes in the flanges of the hubs, are a series of holes G, having a slot $g$ at one side, the slots on one side of the rim being in the opposite direction from the center of the holes to those indicated by E on the opposite side of the rim.

In constructing my wheel a metallic rim is usually employed; but sometimes I use a wooden rim, in which case the openings G and E are dispensed with, and in lieu thereof notches or depressions in the edges of the periphery of the rim may be used, the essential feature in this connection being the uniform length of the spokes, and the depressions being of uniform depth, so that a true circle of the rim is insured. The ends of the spokes are bent uniformly and have a small head on the end, preferably of button shape.

In assembling and connecting the various parts forming my wheel the nut H is screwed back over the hub toward the flange $i$ and the collar $h$, and flange F are pushed up next to the nut. The heads on the end of the spokes are then inserted into the openings F, and afterward the opposite ends of the spokes are hooked into the openings G and E, the spokes C, attached to the flange *i*, being hooked at the side of the rim opposite, while the spokes hooked into the flange F are likewise crossed in the opposite direction and the other ends hooked into the opposite side of the rim. After the headed ends of all the spokes are inserted into the openings in the sides of the rim, they are shoved radially into the slots *g*, which prevents the heads from again coming out. The flange F is then slightly pressed outward, followed by the collar *h*, after which the flanges F and *i*, by means of a suitable wrench or lever applied to them, are slightly rotated in opposite directions, the action of which is to throw the hub ends of all the spokes away from a center line, the spokes D, attached to flange F, moving in the direction of the arrow *m*, while those attached to the opposite flange *i* move in the direction indicated by the arrow *n*. This movement also has a tendency to draw the hook ends of the spokes into the slots in the rim, so that should any from an accidental cause be stretched or become slightly loose it could not become disengaged. The rotating of the flanges on the hub obviously tightens all the spokes uniformly, and the collar *h* is then brought in contact with the flange F, the ratchet-teeth on each engaging and locking the flange F in its position on the hub. The flanges on the hub are further forced away from each other, consequently increasing the tension of the spokes by means of the nut H, which may be screwed and pressed against the collar *h*.

As I usually construct my wheel the spokes C and D alternate with each other, so that the strains on each side are equal; but in some cases, instead of attaching the spokes to the sides of the rim, I may attach them at the center of the inner part of the radius of the rim. In either arrangement, in combination with the devices for producing a tension at the hub, as shown, the necessity of having threaded nipples for connecting the spokes to the rim, as in other devices, is obviated. Where such nipples are used, great difficulties are experienced in the amount of time and labor necessary to tighten all the spokes and maintain the hub in central position. Therefore the advantages of my invention are obvious.

Having described my invention, what I claim, and desire to secure by Letters Patent, is—

1. A vehicle-wheel having a hub provided with a fixed perforated spoke-holding flange at one end and a slidable rotatable spoke-holding flange at opposite end, means for rotating said flanges in opposite directions and locking one in a fixed position in relation to the other so as to produce a tension on spokes of uniform length connected at one end to said flanges while opposite ends are secured to a wheel-rim; a rim having in its sides apertures or openings for receiving spoke ends, said openings having at one side an elongated slot or recess smaller than the opening to which it is connected, and extending all in one direction on one side of the rim and in the opposite direction from the openings on the opposite side of the rim; a series of metallic spokes of uniform length, all identical in form, having a hook on each end and a head on the end of each hook, said hooks being turned over opposite sides from each other, substantially as and for the purpose shown and described.

2. In combination with the hub having adjustable flanges and means for locking them when under strain; the barrel having on the outer diameter a longitudinal groove or keyway and a series of screw-threads, a movable collar provided with a dowel or feather protruding from the inside of its central opening into said groove on the barrel, said collar having on its outer side face a series of ratchet-teeth or notches, a threaded nut movable over said barrel for the purpose of spreading said flanges apart, substantially as and for the purpose shown and described.

3. In a vehicle-wheel having one fixed and one loose revoluble flange on the hub for holding spoke ends, the combination of a series of metallic spokes having hook ends and a head on end of each hook, said hooks being turned in opposite directions from each other relatively to the line of the spoke, said spokes being all of a uniform length and form, substantially as and for the purpose shown and described.

4. In a vehicle-wheel having a series of uniformly-made metallic spokes provided with headed hook ends, the combination of the wheel-rim having a series of holes for receiving said headed spokes, said holes having at one side a slot or elongated depression smaller than the connecting holes, said slots being in reverse direction on each side of the rim from the holes, substantially as shown and for the purpose described.

In testimony whereof I affix my signature in presence of two witnesses.

JAMES F. McCORMICK.

Witnesses:
JNO. S. THURMAN,
E. T. SILVIUS.